(12) United States Patent
Kang

(10) Patent No.: US 11,936,268 B2
(45) Date of Patent: Mar. 19, 2024

(54) MOTOR

(71) Applicant: LG INNOTEK CO., LTD., Seoul (KR)

(72) Inventor: Young Gu Kang, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 305 days.

(21) Appl. No.: 17/631,993

(22) PCT Filed: Jul. 29, 2020

(86) PCT No.: PCT/KR2020/009845
§ 371 (c)(1),
(2) Date: Feb. 1, 2022

(87) PCT Pub. No.: WO2021/025351
PCT Pub. Date: Feb. 11, 2021

(65) Prior Publication Data
US 2022/0278582 A1    Sep. 1, 2022

(30) Foreign Application Priority Data

Aug. 2, 2019  (KR) .................. 10-2019-0094190

(51) Int. Cl.
*H02K 3/52* (2006.01)
*B62D 5/04* (2006.01)

(52) U.S. Cl.
CPC ........... *H02K 3/522* (2013.01); *B62D 5/0403* (2013.01); *H02K 2203/12* (2013.01)

(58) Field of Classification Search
CPC .... H02K 3/522; H02K 2203/12; H02K 1/148; H02K 1/274; H02K 3/345; H02K 11/215; H02K 1/146; B62D 5/0403
See application file for complete search history.

(56) References Cited

U.S. PATENT DOCUMENTS

2007/0096587 A1   5/2007  Ionel et al.
2011/0291498 A1  12/2011  Sakata et al.
2017/0005538 A1   1/2017  Lee

FOREIGN PATENT DOCUMENTS

| EP | 3 176 915 A1 | 6/2017 | |
| JP | 2017-17981 A | 1/2017 | |
| KR | 10-2008-0081440 A | 9/2008 | |
| WO | WO 2016/017030 A1 | 2/2016 | |
| WO | WO-2019045280 A1 * | 3/2019 | ............... H02K 1/24 |

* cited by examiner

*Primary Examiner* — Mohamad A Musleh
(74) *Attorney, Agent, or Firm* — Birch, Stewart, Kolasch & Birch, LLP

(57) ABSTRACT

The present invention may provide a motor comprising: a shaft; a rotor coupled to the shaft; and a stator disposed so as to correspond to the rotor, wherein the stator comprises: a yoke; a tooth protruding from the yoke; and an insulator disposed on the tooth, wherein the insulator comprises: a body having a coil wound therearound; and an inner guide disposed in the body in a radial direction, wherein the tooth comprises: a first surface facing the rotor; a second surface forming a shoe of the tooth; and a third surface connecting the first surface and the second surface, and wherein the inner guide is disposed so as to not overlap with the third surface in an axial direction.

6 Claims, 6 Drawing Sheets

MOTOR

CROSS REFERENCE TO RELATED APPLICATIONS

This application is the National Phase of PCT International Application No. PCT/KR2020/009845, filed on Jul. 29, 2020, which claims priority under 35 U.S.C. 119(a) to Patent Application No. 10-2019-0094190, filed in the Republic of Korea on Aug. 2, 2019, all of which are hereby expressly incorporated by reference into the present application.

TECHNICAL FIELD

Embodiments relates to a motor.

BACKGROUND ART

The electronic power steering (EPS) system is a device that enables a driver to safely drive by ensuring the cornering stability of the vehicle and providing a quick recovery force. Such electronic power steering system controls the drive of the steering shaft of the vehicle by driving a motor through an electronic control unit (ECU) according to driving conditions detected by a vehicle speed sensor, a torque angle sensor, a torque sensor, and the like.

The motor includes a stator and a rotor. The stator may include teeth forming a plurality of slots, and the rotor may include a plurality of magnets facing the teeth. Adjacent teeth are disposed apart from each other to form a slot open therebetween.

Through the hot press-fitting method, the stator can be arranged in the inside of the housing. In the hot press-fitting method, the housing diameter is expanded by heating the housing, in which state the stator is inserted in the housing, and then, as the housing returns to its initial state, the housing with the decreasing diameter presses the stator inward, thereby fixing them to each other. In this regard, since the stator is pressed inward while the housing is contracted, the slot open between the teeth may be deformed. Alternatively, the stator core may be aligned using a jig that presses the outer circumferential surface of the stator core. Even in this case, since the jig presses the stator inward, deformation may occur in the slot open between the teeth.

This deviation for the slot open may problematically lead to the generation of cogging torque.

DISCLOSURE

Technical Problem

Accordingly, the embodiment is intended to address the above problems, and an object of the present invention is to provide a motor capable of reducing cogging torque.

The problems which the embodiments intend to address are not limited to the ones mentioned above, and those skilled in the art will clearly understand from the following description that other problems not mentioned above can be solved.

Technical Solution

An embodiment may provide a motor including: a shaft; a rotor coupled to the shaft; and a stator disposed so as to correspond to the rotor, wherein the stator includes a yoke, a tooth protruding from the yoke, and an insulator disposed on the tooth, wherein the insulator includes a body having a coil wound therearound, and an inner guide disposed on an inner side of the body in a radial direction, wherein the tooth includes a first surface facing the rotor, a second surface forming a shoe of the tooth, and a third surface connecting the first surface and the second surface, and wherein the inner guide is disposed so as not to overlap the third surface in an axial direction.

Preferably, the inner guide includes an inner surface facing the rotor, and the inner surface includes a plurality of fourth surfaces spaced apart from the third surface in a radial direction.

Preferably, the inner guide includes a fifth surface that is arranged stepwise with respect to the plurality of fourth surfaces, and wherein the fifth surface is disposed closer to the shaft in a radial direction than the plurality of fourth surfaces, and the plurality of fourth surfaces are respectively disposed on both sides of the fifth surface.

Preferably, the first surface and the third surface of the tooth are arranged so as to be exposed without being covered by the inner guide.

An embodiment may provide a motor including: a shaft; a rotor coupled to the shaft; and a stator disposed so as to correspond to the rotor, wherein the stator includes a yoke, a tooth protruding from the yoke, and an insulator disposed on the tooth, wherein the insulator includes a body having a coil wound therearound, and an inner guide disposed on an inner side of the body in a radial direction, wherein the inner guide includes an inner surface facing the rotor, wherein the inner surface includes fourth surfaces disposed on both sides of the tooth, respectively, and a fifth surface disposed on a top or bottom of the tooth, and wherein based on the center of the shaft, the fourth surface is disposed farther in a radial direction than the fifth surface.

Preferably, the fourth surfaces and the fifth surface are arranged stepwise.

Preferably, the maximum circumferential width of the inner guide is greater than the maximum circumferential width of the tooth, and the circumferential width of the fifth surface is less than the maximum circumferential width of a tooth.

Preferably, the inner guides of the insulators respectively disposed on the teeth adjacent to each other are in contact with each other.

Advantageous Effects

According to the embodiment, the deviation of the slot open is reduced by securing a space which the jig enter through the slot open, so that there is provided an effect that the cogging torque can be reduced.

BEST MODE

Hereinafter, preferred embodiments of the present invention will be described in detail with reference to the accompanying drawings. Objects, specific advantages and inventive features of the present invention will become more apparent from the following detailed description in conjunction with the accompanying drawings, and preferred embodiments. And, in describing the present invention, detailed descriptions of related known technologies that may unnecessarily obscure the summarized spirit of the present invention will be omitted.

Figure 1:
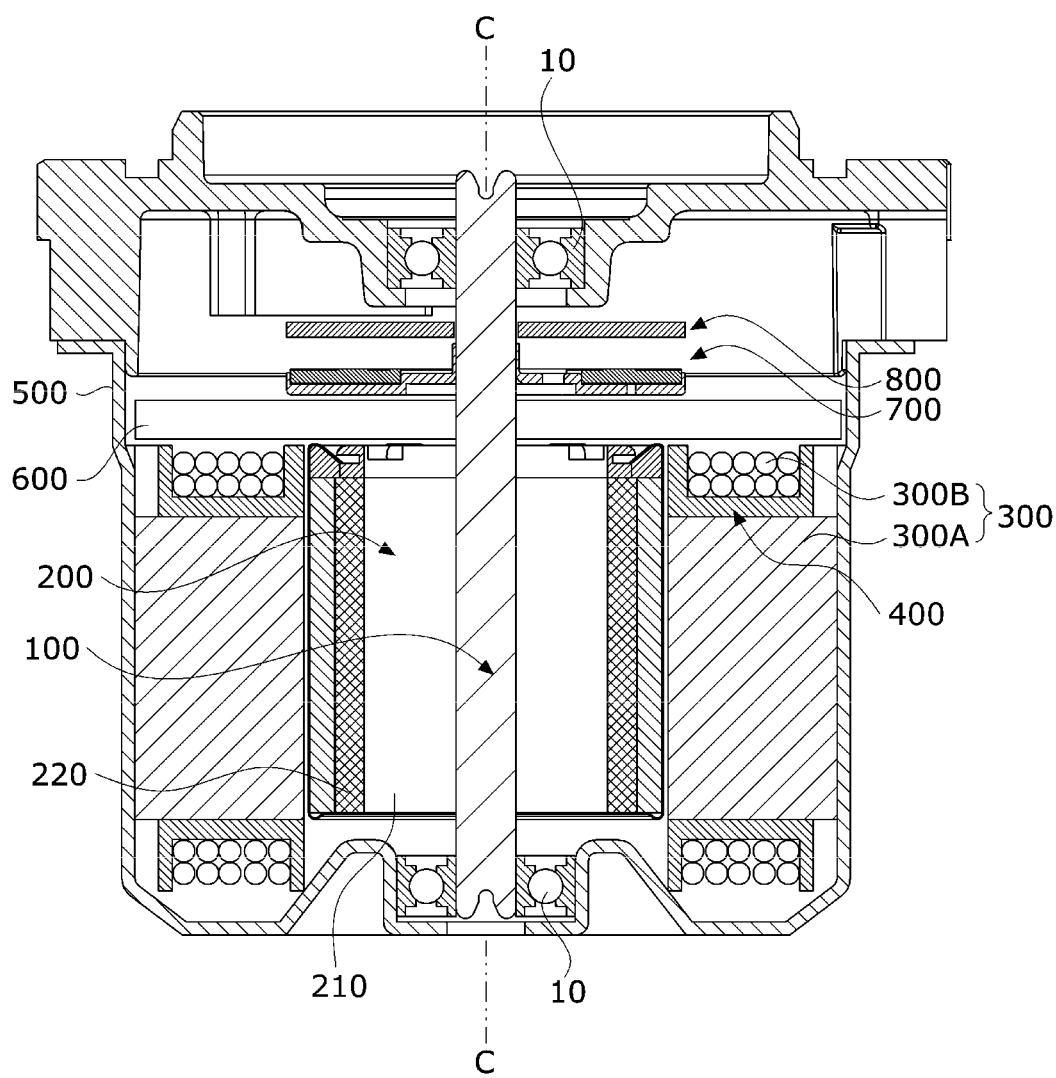
FIG. 1 is a diagram illustrating a motor according to an embodiment.

FIG. 1 is a diagram illustrating a motor according to an embodiment.

Referring to FIG. 1, the motor according to the embodiment may include a shaft 100, a rotor 200, a stator 300, an insulator 400, a housing 500, a bus bar 600, a sensing part 700, and a substrate 800. Hereinafter, the term "inner" refers to a direction from the housing 500 to the shaft 100, i.e., the center of the motor, and the term "outer" refers to a direction from the shaft 100 to the housing 500, i.e., a direction opposite to the "inner."

The shaft 100 may be coupled to the rotor 200. When electromagnetic interaction occurs between the rotor 200 and the stator 300 through the supply of current, the rotor 200 rotates and the shaft 100 rotates in conjunction therewith. The shaft 100 is rotatably supported by a bearing 10. The shaft 100 may be connected to a steering mechanism of a vehicle to transmit power thereto.

The rotor 200 rotates through electrical interaction with the stator 300. The rotor 200 may be disposed inside the stator 300. The rotor 200 may include a rotor core 210 and a magnet 220 disposed on the rotor core 210. In this regard, the rotor 200 may be an SPM type in which the magnet 220 is disposed on the outer peripheral surface of the rotor core 210, or may be an IPM type in which the magnet 220 is embedded inside the rotor core 210.

The stator 300 is disposed outer the rotor 200. The stator 300 may include a stator core 300A, a coil 300B, and an insulator 400 mounted on the stator core 300A. The coil 300B may be wound around the insulator 400. The insulator 400 is disposed between the coil 300B and the stator core 300A, and serves to electrically insulate the stator core 300A and the coil 300B from each other. The coil 300B causes an electrical interaction with the magnet of the rotor 200.

The bus bar 600 is disposed above the stator 300. The bus bar 600 includes a bus bar holder (not shown) made of an insulating material and a plurality of terminals (not shown) coupled to the bus bar holder. In this case, as the bus bar holder is formed of an insulating material, it can prevent a plurality of terminals from contacting and being connected to each other. In addition, the plurality of terminals connect the coils 300B wound around the stator core 300A to each other, and function to apply electric current to each coil.

The sensing part 700 may be coupled to the shaft 100. The sensing part 700 includes a sensing plate (not shown) and a sensing magnet (not shown) disposed on the top of the sensing plate. On the substrate 800, a sensor for sensing the magnetic force of a sensing magnet (not shown) may be disposed. In this case, the sensor may be a Hall IC, and serves to sense the magnetic flux of the sensing magnet of the sensing part 700 coupled to the shaft 100. The sensing part 700 and the substrate 800 function to detect the position of the rotor 200 by sensing the magnetic flux changing according to its rotation.

Figure 2:
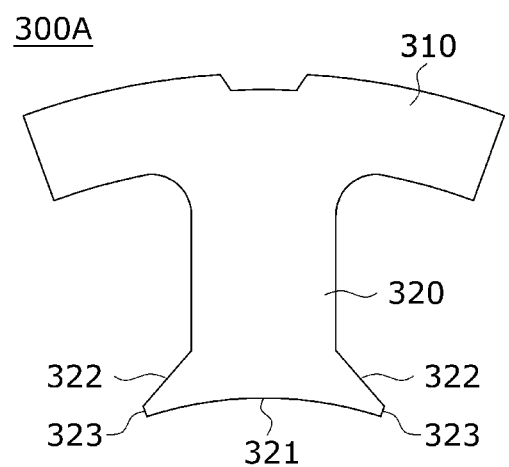
FIG. 2 is an enlarged view of the stator core.

FIG. 2 is an enlarged view of the stator core.

Referring to FIG. 2, the stator core 300A may include a yoke 310 and a tooth 320. The tooth 320 may protrude from the inner peripheral surface of the yoke 310. There may be a plurality of teeth 320. The number of teeth 320 may be variously changed in response to the number of magnets. The stator core 300A may be formed by combining a plurality of divided cores including such yoke 310 and such tooth 320.

The tooth 320 may include a first surface 321, a second surface 322, and a third surface 323.

The first surface 321 may be an inner peripheral surface of the tooth 320 facing the rotor 200. The second surface 322 is a surface forming a shoe of the tooth 320. The third surface 323 is a surface connecting the first surface 321 and the second surface 322, and is a surface serving as a reference for the slot open. The third surface 323 may be disposed so as to form angled edges with the first surface 321 and the second surface 322, respectively.

Figure 4:
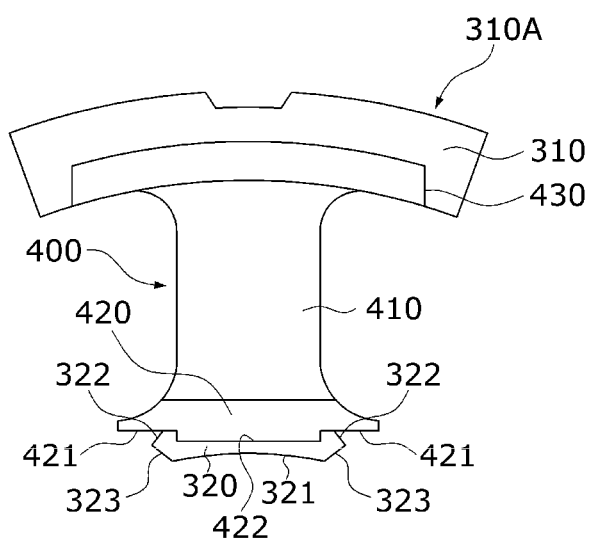
FIG. 4 is a diagram illustrating the stator core to which the insulator is mounted.

FIG. 4 is a diagram illustrating a stator core to which an insulator is mounted.

Referring to FIG. 4, the insulator 400 may include a body 410, an inner guide 420, and an outer guide 430. The body 410 is where the coil is wound. The inner guide 420 is disposed on the inside of the body 410 in the radial direction. The inner guide 420 supports the coil wound around the body 410. The outer guide 430 may be disposed on the outside of the body 410. The outer guide 430 supports the coil wound around the body 410.

Both side ends of the inner guide 420 may be disposed to protrude than both ends of the tooth 320. The both side ends of the inner guide 420 may support the lower end of the coil.

This inner guide 420 may be disposed so as not to overlap the third surface 323 in the axial direction. For example, the inner guide 420 may be disposed so that the first surface 321 and the third surface 323 are not covered by the inner guide 420. Additionally, the inner guide 420 may be disposed such that at least a portion of the second surface 322 connected to the third surface 323 is not covered by the inner guide 420. This is to secure the entry space of the jig entering along the third surface (323).

Specifically, the inner guide 420 may include a fourth surface 421. The fourth surface 421 is one of the inner surfaces of the inner guide 420, which faces the rotor 200 in the radial direction. The fourth surface 421 is disposed to be spaced apart from the third surface 323 in the radial direction, thereby securing the entry space of the jig to the outside of the third surface 323.

Meanwhile, the inner guide 420 may include a fifth surface 422. The fifth surface 422 is disposed closer to the shaft 100 in the radial direction than the fourth surface 421. The fourth surface 421 may be disposed on both sides of the fifth surface 422, respectively. The fourth surface 421 and the fifth surface 422 may be arranged stepwise. The fourth surface 421 may be disposed on both sides of the inner guide 420, and the fifth surface 422 may be disposed on the top of the inner guide 420.

Figure 3:
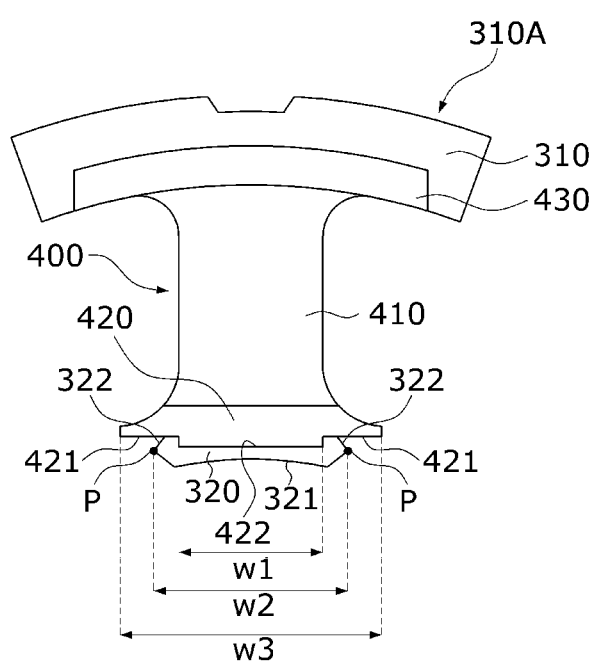
FIG. 3 is a diagram illustrating the dimensions of an inner guide of an insulator mounted to the stator core.

FIG. 3 is a diagram illustrating the dimensions of an inner guide of an insulator mounted to a stator core.

Referring to FIG. 3, the maximum circumferential width w3 of the inner guide 420 may be greater than the maximum circumferential width w2 of the tooth 320. The reference of the maximum circumferential width w2 of the tooth 320 may be the edge P that is a boundary between the second surface 322 and the third surface 323. In addition, the circumferential width w1 of the fifth surface 422 may be less than the maximum circumferential width w2 of the tooth 320.

Figure 5:
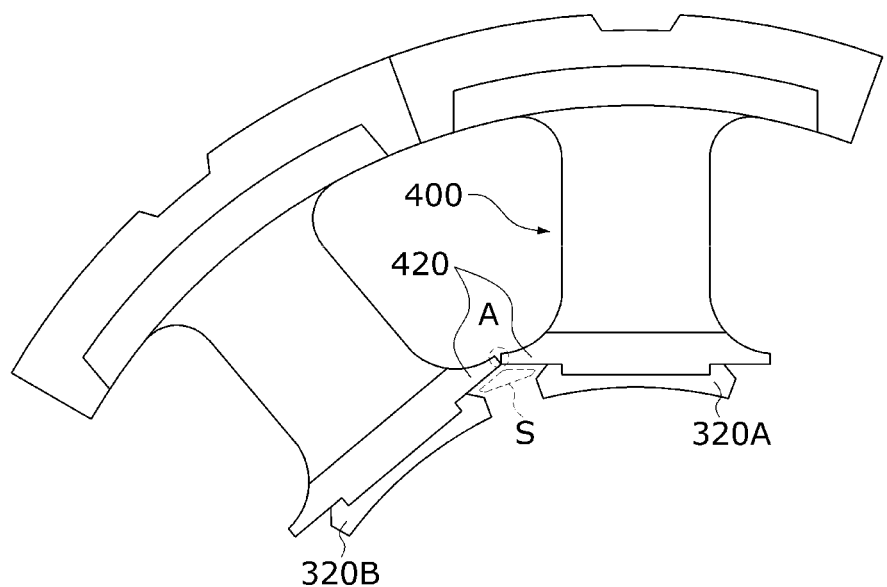
FIG. 5 is a diagram illustrating the entry space of the jig entering the slot open.

Referring to FIG. 5, it is a diagram illustrating the entry space of the jig entering the slot open.

Referring to FIGS. 4 and 5, the fourth surface 421 of the inner guide 420 is configured to be spaced apart from the edge P, that is, the boundary between the second surface 322 and the third surface 323, and thus, the entry space of the jig is secured on the outside of the slot open disposed between the first tooth 320A and the second tooth 320B adjacent to each other based on the circumferential direction. In this case, the inner guide 420 of the insulator 400 disposed on the first tooth 320A and the inner guide 420 of the insulator 400 disposed on the second tooth 320B may contact each other. This has the advantage of increasing the structural safety of the inner guide 420.

Figure 6:
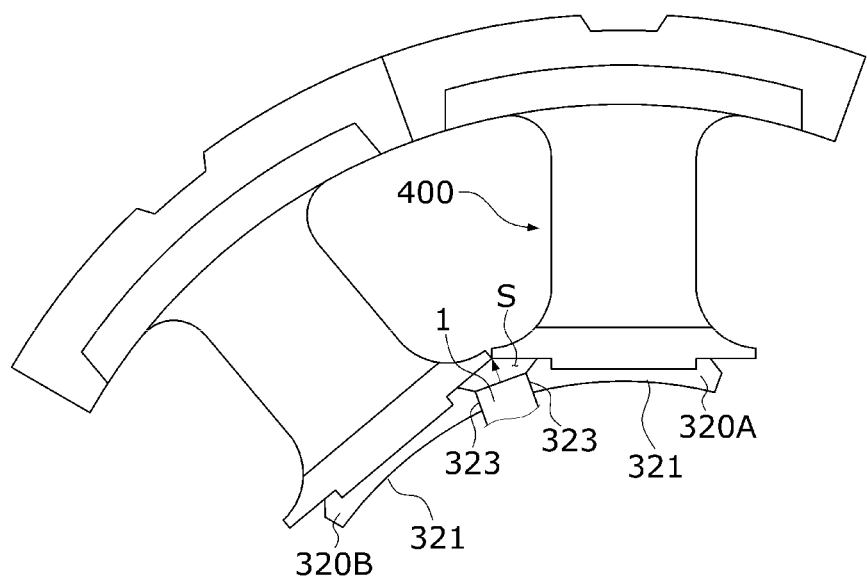
FIG. 6 is a diagram illustrating the jig entering the slot open.

Referring to FIG. 6, it is a diagram illustrating the jig entering the slot open.

Referring to FIG. 6, the jig 1 may enter along the third surface 323 of the tooth 320. Since the radial length of the third surface 323 is very short, based on the radial direction, the end of the jig 1 must enter enough to pass past the edge, i.e., the boundary between the third surface 323 and the second surface 322, in order to support the adjacent teeth 320 and to reduce the deviation of the slot open. Since the motor according to the embodiment secures the entry space S of the jig 1 at both ends of the inner guide 420, the jig 1 can enter enough to support the teeth 320.

In this way, the inner guide 420 of the insulator 400 secures a structure for supporting the lower end of the coil, and secures the entry space for the jig 1, and, as a result, there is an advantage of enabling the use of the jig 1 that can directly support the teeth 320 in the slot open. When the jig 1 is used in the slot open, it is possible to effectively reduce the deviation occurring in the slot open due to the shrinkage force of the housing 500 after thermal press-fitting, or the external force due to the jig used toward the outer peripheral surface of the stator core 300A.

Hereinabove, the motor according to one preferred embodiment of the present invention has been described in detail with reference to the accompanying drawings.

The above description is merely illustrative of the technical idea of the present invention, and various modifications, changes, or substitutions can be made by those of ordinary skill in the art to which the present invention pertains, without departing from the essential characteristics of the present invention. Accordingly, the embodiments disclosed in the present invention and the accompanying drawings are not for limiting, but for explaining the technical spirit of the present invention, and the scope of the technical spirit of the present invention is not limited by these embodiments and the accompanying drawings. The protection scope of the present invention should be construed by the following claims, and all technical ideas within the scope equivalent thereto should be construed as being included in the scope of the present invention.

The invention claimed is:

1. A motor comprising:
   a shaft;
   a rotor coupled to the shaft; and
   a stator disposed so as to correspond to the rotor,
   wherein the stator includes a yoke, a tooth protruding from the yoke, and an insulator disposed on the tooth,
   wherein the insulator includes a body having a coil wound therearound, and an inner guide disposed on an inner side of the body in a radial direction,
   wherein the tooth includes a first surface facing the rotor, a second surface forming a shoe of the tooth, and a third surface connecting the first surface and the second surface,
   wherein the inner guide is disposed so as not to overlap the third surface in an axial direction,
   wherein the inner guide is disposed such that at least a portion of the second surface connected to the third surface is not covered by the inner guide, and
   wherein both side ends of the inner guide is disposed to protrude than both ends of the tooth.

2. The motor of claim 1, wherein the inner guide includes an inner surface facing the rotor, and
   wherein the inner surface includes a plurality of fourth surfaces spaced apart from the third surface in a radial direction.

3. The motor of claim 2, wherein the inner guide includes a fifth surface that is arranged stepwise with respect to the plurality of fourth surfaces,
   wherein the fifth surface is disposed closer to the shaft in a radial direction than the plurality of fourth surfaces, and
   wherein the plurality of fourth surfaces are respectively disposed on both sides of the fifth surface.

4. The motor of claim 2, wherein the fourth surfaces and the fifth surface are arranged stepwise.

5. The motor of claim 1, wherein the maximum circumferential width of the inner guide is greater than the maximum circumferential width of the tooth, and
   wherein the circumferential width of the fifth surface is less than the maximum circumferential width of the tooth.

6. The motor of claim 1, wherein the inner guides of the insulators respectively disposed on the teeth adjacent to each other are in contact with each other.

* * * * *